(12) United States Patent
Flores et al.

(10) Patent No.: US 12,511,694 B1
(45) Date of Patent: Dec. 30, 2025

(54) SYSTEMS AND METHODS FOR INSURANCE FOR NFTS AND DIGITAL ASSETS

(71) Applicant: United Services Automobile Association (USAA), San Antonio, TX (US)

(72) Inventors: Christopher E. Flores, San Antonio, TX (US); Jennifer M. Chandler-Bradley, Tampa, FL (US); Elena M. Carrasco, Converse, TX (US); Keegan P. Hayes, Whitestown, IN (US); Nikhil Dama, Apex, NC (US); Yibin Xu, San Antonio, TX (US); Neetu Jain, Coppell, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/827,609

(22) Filed: May 27, 2022

(51) Int. Cl.
G06Q 40/08 (2012.01)
G06Q 10/10 (2023.01)
G06Q 30/018 (2023.01)

(52) U.S. Cl.
CPC ............. G06Q 40/08 (2013.01); G06Q 10/10 (2013.01); G06Q 30/0185 (2013.01)

(58) Field of Classification Search
CPC ..... G06Q 40/08; G06Q 10/10; G06Q 30/0185
USPC ..................................................... 705/3–44
See application file for complete search history.

(56) References Cited

U.S. PATENT DOCUMENTS

| | | | | |
|---|---|---|---|---|
| 10,796,022 | B2 * | 10/2020 | Dassenno | H04L 9/3242 |
| 2019/0354723 | A1 * | 11/2019 | Dassenno | G06F 21/645 |
| 2020/0118131 | A1 * | 4/2020 | Diriye | H04L 9/3239 |
| 2022/0270084 | A1 * | 8/2022 | Xue | H04L 9/088 |
| 2022/0414621 | A1 * | 12/2022 | Parlotto | G06F 21/64 |
| 2023/0046789 | A1 * | 2/2023 | Dassenno | H04W 12/108 |
| 2023/0108983 | A1 * | 4/2023 | Vosseller | H04L 9/3213 705/76 |

OTHER PUBLICATIONS

Chiu et al., "Exploring the Assetization and Financialization of Non-fungible Tokens: Opportunities and Regulatory Implications", Banking & Finance Law Review 37.3: 401-438, HAB Press Limited, Aug. 2022.*

Bonnett et al., "Impact of blockchain and distributed ledger technology for the management, protection, enforcement and monetization of intellectual property: a systematic literature review", Information Systems and e-Business Management 21:229-275, (Year: 2023).*

* cited by examiner

*Primary Examiner* — Frantzy Poinvil
(74) *Attorney, Agent, or Firm* — BakerHostetler (57) ABSTRACT

A loss of a non-fungible token (NFT) may be determined. A search may be conducted to identify a digital twin of the NFT. If the digital twin of the NFT is found, a replacement NFT may be minted using the digital twin. Rights to the replacement NFT may be awarded to an owner. If the digital twin of the NFT is not found, a compensation for the owner of the NFT may be determined.

20 Claims, 6 Drawing Sheets

SYSTEMS AND METHODS FOR INSURANCE FOR NFTS AND DIGITAL ASSETS

Blockchain networks continue to evolve and impact all aspects of business. Non-fungible tokens ("NFT's") have come to the forefront of these markets as a manner of establishing ownership of unique assets (as opposed to fungible tokens such as a bitcoin or fraction thereof) on a blockchain.

SUMMARY

A method for insurance for NFT's and digital assets may include determining a loss of a non-fungible token (NFT). A search may be conducted to identify a digital twin of the NFT. If the digital twin of the NFT is found, a replacement NFT may be minted using the digital twin. Rights to the replacement NFT may be awarded to an owner. If the digital twin of the NFT is not found, a compensation for the owner of the NFT may be determined.

A system for NFT's and digital assets may include a loss component configured to determine a loss of a non-fungible token (NFT). The system may include a search component configured to conduct a search to identify a digital twin of the NFT. The system may include a minting component configured to mint a replacement NFT using the digital twin if the digital twin of the NFT is found. The system may include a compensation component configured to determine a compensation for the owner of the NFT if the digital twin of the NFT is not found.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The following drawings show generally, by way of example, but not by way of limitation, various examples discussed in the present disclosure. In the drawings.

DETAILED DESCRIPTION

A non-fungible token (NFT) is a unique and non-interchangeable unit of data stored on a blockchain and representing a unique asset. An NFT may function as a certificate of ownership, authenticity, origin, uniqueness, and/or permanence of a particular digital asset (e.g., an image, gif, video, audio, game, ticket, and/or another type of digital files) or a particular physical asset. The NFT may include a license to the asset for a specified purpose, such as to use, copy, or display the asset for personal or commercial purposes. NFT's can be stored in digital wallets. NFT's can be exchanged using blockchain transactions. NFT's leverage blockchain technology to establish a verified and public proof of ownership of NFT's. Like cryptographic tokens and/or cryptocurrency, NFT's can be traded on a blockchain. However, unlike cryptographic tokens and/or cryptocurrency, NFT's are not mutually interchangeable (e.g., not "fungible"). Because different NFT's are associated with different underlying assets, they differ in value.

Figure 1:
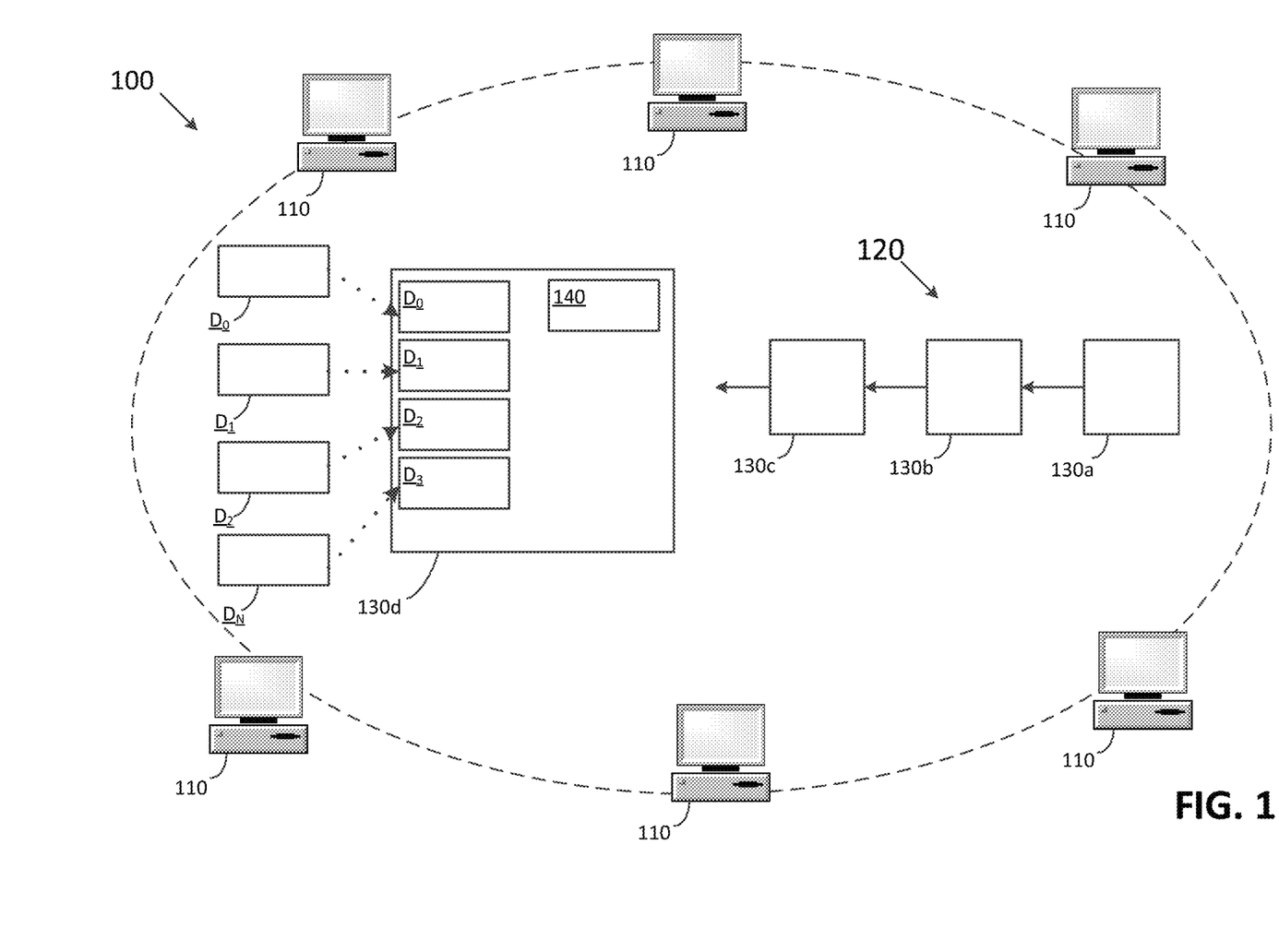
FIG. 1 shows an example distributed system architecture.

FIG. 1 shows an example distributed system 100 that may maintain a blockchain 120 storing one or more NFT's. The distributed system 100 may comprise a peer-to-peer network. The distributed system 100 may comprise a network of nodes 110. A node 110 may comprise a computing device, a central processing unit, a graphical processing unit, a field programmable gate array, or an application specific integrated circuit. A node 110 may comprise an Internet of Things ("IoT") device, such as a device with computing capabilities or network connectivity capabilities.

The network of nodes 110 may function as a decentralized database—a database without a central administrator or centralized storage. For example, each node 110 in the network may store a copy of a collection of data, such as entries and/or transactions. The data may be replicated, shared, or synchronized across the nodes 110. The decentralized database may be continually reconciled, such as to reflect changes to the collection of data. The nodes 110 may continually or periodically transmit or download the most recent version of the collection of data, such as from each other. When a node 110 joins the network, the node 110 may automatically download the collection of data, such as from one of the other nodes 110.

The decentralized database may comprise the blockchain 120. A blockchain 120 may comprise one or more blocks 130 in which data is recorded. The blocks 130 in the blockchain 120 may be function as a mechanism to organize the data in the blockchain 120. For example, the blocks 130 may be linked in a sequence determined by a relationship of the data in the blocks 130, such as the chronology in which the data is recorded or validated. The blocks 130 may be linked to deter retroactive modification of data in the blockchain 120.

The nodes 110 in the network may build the blockchain 120, such as by adding blocks 130 to the blockchain 120. The nodes 110 may perform several operations to build the blockchain 120. For example, when new data $D_0, D_1, D_2, D_N$ is received by the network, the nodes 110 may validate the new data $D_0, D_1, D_2, D_N$. As an example, if the new data $D_0, D_1, D_2, D_N$ comprises transactions, the nodes 110 may validate, verify, or authenticate the identity of the parties to the transaction. A transaction may comprise an indication of an NFT, such as a web address or uniform resource locator (URL) to the NFT. The transaction may comprise an indication of a party transferring the NFT and/or a party receiving the NFT, such as public keys, wallet addresses, and/or digital signatures of the parties. The digital signature may comprise the hash of transaction data, such as with a cryptographic hash function. The digital signature may comprise a hash of transaction data encrypted with a private key corresponding to the public key. Examples of hash functions include MD4, MD5, SHA-1, SHA-256, SHA-512, and SHA-3. The digital signature may be validated by the nodes 110, such as by decrypting the digital signature using the public key. The digital signature may allow for verification of the transaction while maintaining the anonymity of the parties to the transaction.

The nodes 110 may collate the new data $D_0, D_1, D_2, D_N$ into a new block 130d. The nodes 110 may perform an operation to add the new block 130d to the chain 120. For example, if the data in the blocks 130 is related chronologically, such as where the first block 130a in the chain records older data than the data of subsequent blocks 130b, 130c, the nodes 110 may perform a timestamp function to log the sequence in which blocks 130 are added to the blockchain 120. The nodes 110 may append a hash of the previous block 130c to the new bock 130d. The nodes 110 may insert an output of the previous block 130 in an input of the new block 130d. The chaining of the blocks, such as through iterative functions, may deter retroactive modification of data in a block 130 as the modification would require new functions to be performed for all of the subsequent blocks 130 in the chain 120.

The nodes 110 may be incentivized to perform the operation to add a new block 130d to the blockchain 120. For example, a block 130d may be assigned a value, such as a coin or unit of digital currency that will be transferred to one or more nodes 110 that perform part of all of the operation. A digital currency may comprise a cryptocurrency, such as Bitcoin, Litecoin, or TorCoin. The value may depend on the difficulty of performing the operation for the block 130d. Also, if the data $D_0$, $D_1$, $D_2$, $D_N$ recorded in a block 130d comprises transactions, a transaction may assign a transaction fee which may be transferred to one or more nodes 110 that perform the operation on the block 130d in which the transaction is recorded. If an incentive is provided for nodes 110 to perform the operation to add the new block 130d to the chain 120, performance of the operation may be referred to as mining.

Nodes 110 may work together to perform the operations to build the blockchain 120. For example, the nodes 110 may lend or combine their processing power, such as in a pool, to perform an operation to build the chain 120. If the nodes 110 work in tandem, incentives, such as the values of blocks or fees associated with transactions, may be divided amongst the nodes 110. For example, a node 110 may receive a portion of an incentive or transaction fee proportional to the contribution of the node 110 to the work to build a block or validate a transaction.

Once the operation is performed to add a new block 130d to the blockchain 120, the nodes 110 may communicate the new block 130d to the network. The nodes 110 may express their acceptance of the new block 130d to the chain 120 by working off the block 130d when performing the operation to add a subsequent block to the chain 120. If more than one version of the chain 120 exists, the nodes 110 may attempt to work off the longest chain 120. The longest chain 120 may be determined by an algorithm for scoring the chain 120. For example, a chain 120 may be assigned a score based on the computational work required to create the chain 120. A node 110 may communicate the longest chain 120 that the node 110 has observed to the network, such as with a gossip protocol.

The network may have self-correcting mechanisms, such as to address discrepancies between nodes 110 in the network. For example, if there is a fork in a blockchain 120, a node 110 working off one branch of the blockchain 120 may switch to a second branch of the blockchain 120 if the second branch becomes longer than the first branch. As another example, if a node 110 does not receive a block 130, the node 110 may request the block 130 when it receives the next block 130 and determines that it did not receive the previous block 130.

Figure 2:
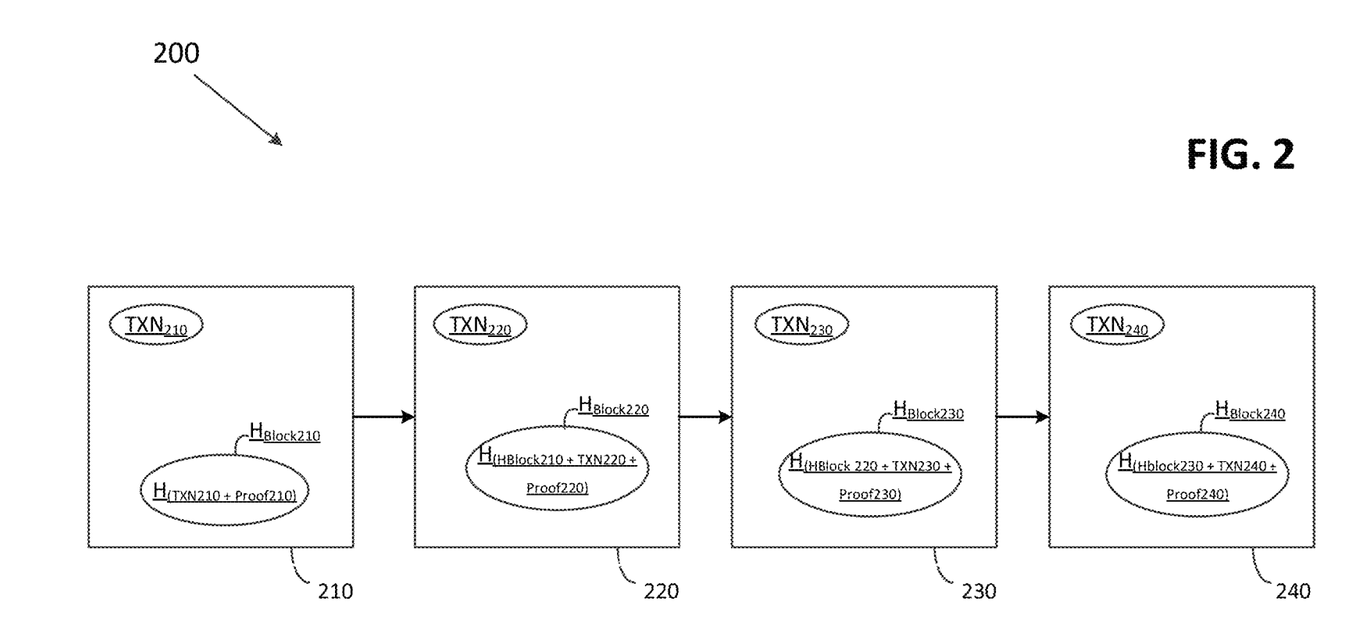
FIG. 2 shows an example blockchain architecture.

FIG. 2 shows an example blockchain 200. The blockchain 200 may be stored on nodes of a distributed system (e.g., nodes 110 in FIG. 1). The blockchain 200 may comprise or be similar to a Bitcoin blockchain, an Ethereum blockchain, a FLOW blockchain, a Tezos blockchain, or a Solana blockchain, as examples. The blockchain 200 may comprise one or more blocks 210, 220, 230, 240 in which one or more transactions, such as transactions exchanging NFT's, are recorded. The blocks 210, 220, 230, 240 may be linked in a sequence that represents the chronology of the execution, validation, or recording of the transactions. For example, the blockchain 200 may comprise a genesis block 210 that records the earliest transaction in the blockchain 200 and comprises the first block 210 in the blockchain 200. Each block 220, 230, 240 following the genesis block 210 may record a transaction that was executed, validated, and/or occurred after the transaction in the preceding block 210, 220, 230 in the blockchain 200 was executed, validated, and/or occurred. To illustrate, the block 230 may record transactions (TXN230) that were executed, validated, and/or occurred after the transactions recorded in the block 220 (TXN220) were executed, validated, and/or occurred. A new transaction may be recorded in a new block. The new block may be appended to the last or current block 240 in the blockchain 200. Although the example blockchain 200 is depicted as comprising 4 blocks 210, 220, 230, 240 the blockchain 200 may comprise less than 4 blocks or more than 4 blocks. The blocks 210, 220, 230, 240 may record transactions as hashes of the transactions ($H_{TXN210}$, $H_{TXN220}$, $H_{TXN230}$, $H_{TXN240}$).

The blocks 210, 220, 230, 240 may function as a mechanism to implement a timestamp server to generate computational proof of the chronological order of the transactions in the blockchain 200. A timestamp of a block 210, 220, 230, 240 may comprise a hash of the transactions (e.g., $T_{XN210}$, $T_{XN220}$, $T_{XN230}$, $T_{XN240}$) of the block 210, 220, 230, 240 and the transactions of the previous block in the blockchain 200. The timestamp may be recorded, such as by publishing. To eliminate the requirement to publish the timestamp, a distributed timestamp server may implement a protocol to achieve distributed chronological consensus, such as a proof protocol. A proof protocol may comprise a proof-of-work protocol, a proof-of-stake protocol, a proof-of-existence protocol, or another proof protocol.

A proof-of-work protocol may comprise solving for a proof (e.g., $Proof_{210}$, $Proof_{220}$, $Proof_{230}$, $Proof_{240}$), such as a string, a cryptographic nonce, or value, that when cryptographically hashed with the transactions of a block and a hash of the previous block yields a hash (e.g., $H_{Block210}$, $H_{Block220}$, $H_{Block230}$, $H_{Block240}$) with a pre-determined number of leading zero bits. For example, a proof may be identified such that the hash has 60 leading bits that are zero.

To illustrate, a proof-of-work for the block 220 may comprise solving for a value (e.g., $Proof_{220}$) that that when hashed with the transactions of the block 220 $TXN_{220}$ and the hash of the previous block 210 $H_{Block210}$ yields an output $H_{Block220}$ that has a pre-determined number of leading zero bits. The next block 230 in the blockchain 200 will be appended to the blockchain 200 when a proof-of-work is performed to identify a proof $Proof_{230}$ which when hashed with the transactions of the block 230 $TXN_{230}$ and the hash of the block 220 $H_{Block220}$ yields an output $H_{Block230}$ with a pre-determined number of leading zero bits. Once the proof is identified, the block 230 may be broadcast through the network. If the block 230 is accepted, the nodes may work on creating the next block 240 in the blockchain 200 using the hash ($H_{Block230}$) of the accepted block 230.

An iterative proof-of-work protocol may deter modification of a block in the chain as it would require re-doing the proof-of-work for each proceeding block in the chain 200. For example, modification of a transaction in the block 210 may require performance of a new proof-of-work for block

210, yielding a new hash ($H_{Block210}$) for the block 210. Consequently, a new proof-of-work may be required for the block 220 using the new hash ($H_{Block210}$) for the block 210, yielding a new hash ($H_{Block220}$) for the block 220. Each subsequent block in the chain 200 may require a new proof-of-work.

Figure 3:
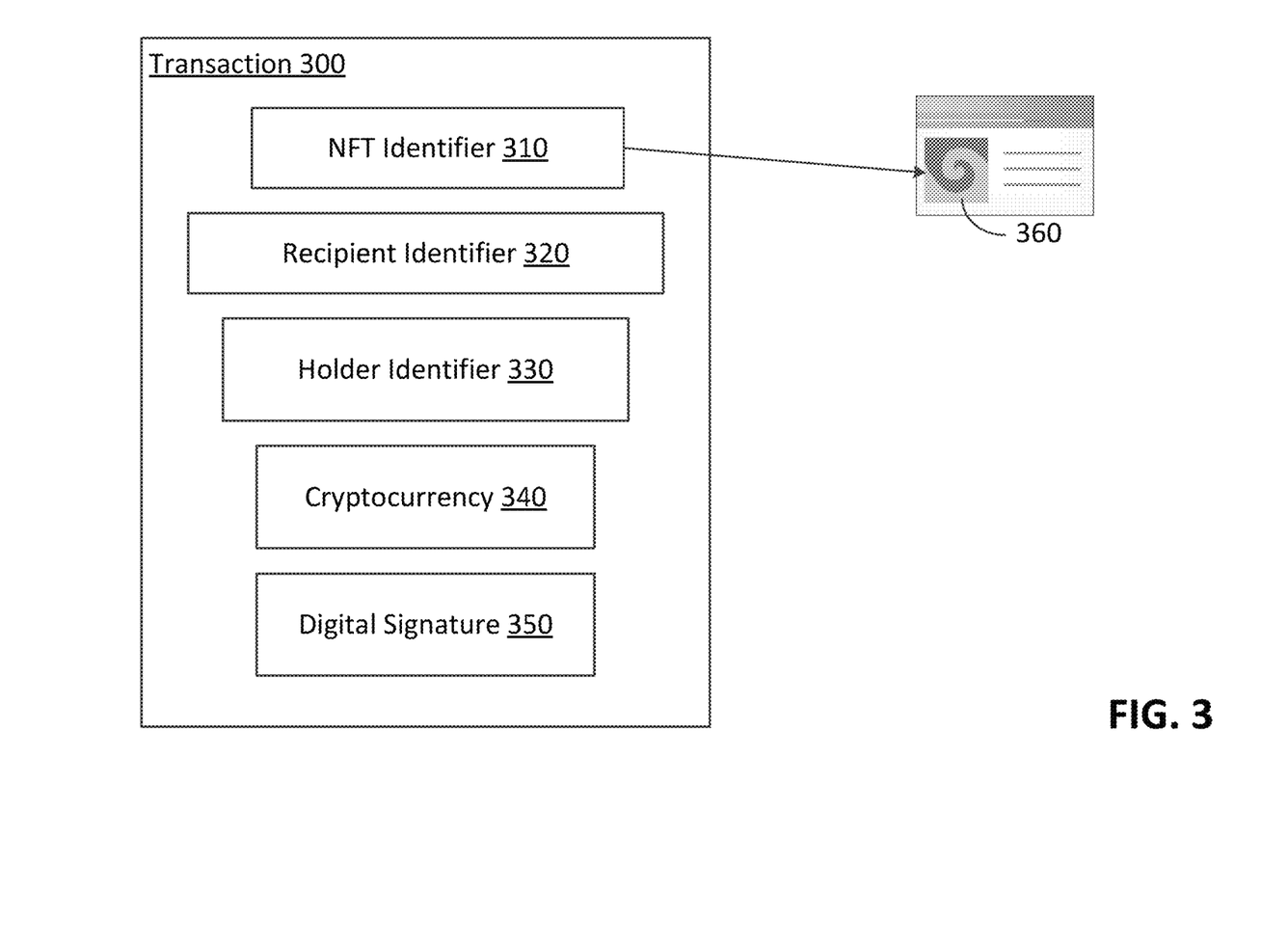
FIG. 3 shows an example NFT transaction.

FIG. 3 shows an example NFT transaction 300. An NFT may comprise a token, such as an ERC-721 token. A token may comprise a form of cryptocurrency or other digital asset. Unlike a coin, a token is a type of cryptocurrency that is not tied to a specific blockchain, or which may be built upon a given blockchain without having the same structure, characteristics, or function of a fungible asset implemented on said blockchain. Instead, a token utilizes another coin's blockchain. For example, an ERC-721 token is built on the Ether (e.g., Ethereum) blockchain.

An NFT may consist of 2 parts—the asset 360 and a representation of the asset that lives on the blockchain. The part that lives on the blockchain may be the transaction 300 and/or an identifier of the NFT 310 in the transaction 300, such as a web address of the asset 360 or a unique token ID.

The transaction 300 may comprise a blockchain entry that effectuates the transfer of the NFT from a holder to a recipient. The transaction 300 may be similar to any of the transactions $TXN_{210}$, $TXN_{220}$, $TXN_{230}$, $TXN_{240}$ in FIG. 2. The transaction 300 may comprise the NFT identifier 310. The transaction 300 may comprise an identifier associated with the recipient of the NFT 320, such as an address of a cryptographic wallet associated with a recipient of the NFT. The transaction 300 may comprise an identifier associated with a holder (e.g., sender, transferor) of the NFT 330, such as a public key of the sender of the NFT and/or an address of a cryptographic wallet associated with the sender of the NFT. The transaction 300 may show a balance of the recipient and/or a balance of the holder. For example, the balance of the recipient may add or include the NFT and the NFT may be removed or absent from the balance of the holder to represent the transfer of the NFT from the holder to the recipient.

The transaction 300 may comprise a denomination of cryptocurrency 340. The cryptocurrency 340 may incentivize nodes to validate the transaction and/or add the transaction to a block on a blockchain. The recipient of the NFT may pay for the NFT, such as by transferring cryptocurrency to the sender in another transaction. The sender of the NFT may return a nominal amount of cryptocurrency 340 back in the NFT transaction 300 in order to ensure that the transaction is added to the blockchain, such as by enticing miner nodes (e.g., mining rigs, mining devices, etc.) to validate the transaction in order to take part of the cryptocurrency 340 as a fee. Alternatively, both parties may pay a denomination of cryptocurrency 340 for the transaction 300 to be validated and added to a block. Other implementations, such as by using traditional currencies or other mediums of exchange, contractual arrangements, or others, alone or in combination with the techniques described above, can be employed without departing from the scope or spirit of the innovation.

If the transaction 300 is part of a smart contract, a self-executing contract on a blockchain, the transaction 300 may be generated and broadcast to the distributed network based on the other transaction (e.g., the paying for the NFT) being executed, validated, and/or added to the blockchain. For example, the transaction 300 may have a piece of information, such as the wallet address of the recipient 320, missing. The transaction 300 may instead make reference to the payment transaction, which may not yet have been executed. When the payment transaction is executed, the payment transaction may comprise the missing information (e.g., the wallet address of the recipient 320) and the transactions may be referenced jointly to effect the transfer of the NFT. When the transaction 300 is added to the blockchain, the NFT may be transferred from the cryptographic wallet of the sender to the cryptographic wallet of the recipient.

The transaction 300 and/or a portion of the transaction 300 may be signed with a digital signature 350, such as a digital signature of the holder of the NFT. The digital signature 350 may comprise encryption with a private key of the holder of the NFT. The digital signature 350 may be authenticated by decrypting the signed portion of the transaction 300 using the public key of the holder of the NFT. The digital signature 350 may allow for authentication of the NFT (e.g., of its originality or genuineness, that it came from the holder) and/or of proof of ownership of the NFT (e.g., proof that the NFT was transferred to the recipient).

The transaction 300 may be received by a node of a distributed system (e.g., a node 110 in the system 100 in FIG. 1). The transaction 300 may be validated and may be stored in a block of a blockchain (e.g., blocks 210, 220, 230, 240 in blockchain 200 in FIG. 2). Based on the transaction 300 being stored to the blockchain, ownership of the NFT may be transferred to the recipient. Based on the transaction 300 being stored to the blockchain, an indication of the NFT may be displayed in the wallet of the recipient. The wallet may comprise software or hardware that stores an indication of the NFT's and cryptocurrency that a user owns and public/private keys associated with the user. The recipient may use the NFT in accordance with a license associated with the NFT, such as by sharing, copying, transferring, or selling the NFT.

Figure 4:
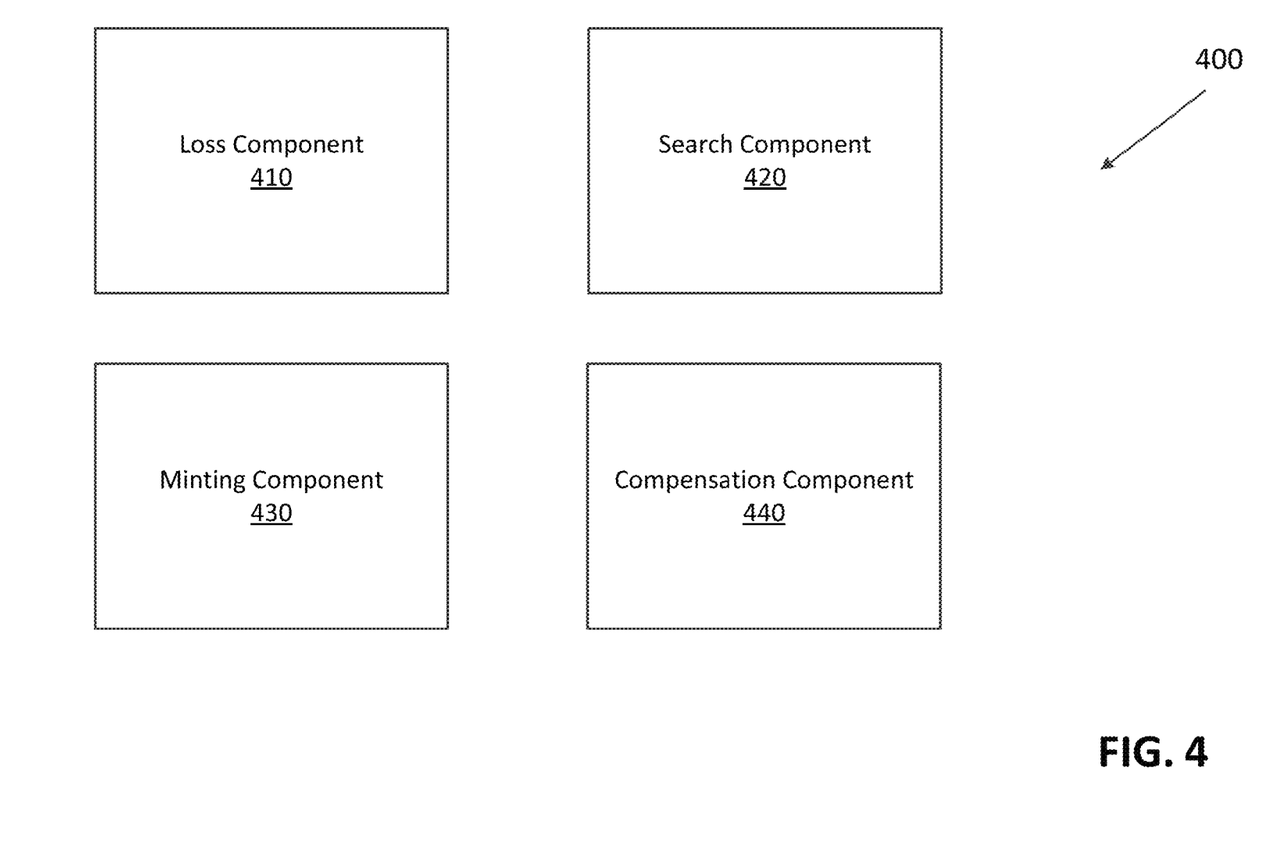
FIG. 4 shows an example system for insurance for NFT's and digital assets.

FIG. 4 shows an example system for insurance for NFT's and digital assets 400. The system 400 may comprise a plurality of computing devices, such as servers, mining rigs, user devices, etc. The system 400 may comprise a distributed system (e.g., the system 100 in FIG. 1) and/or a system having access to a blockchain (e.g., blockchain 120 in FIG. 1, blockchain 200 in FIG. 2).

The system may comprise a loss component 410. The loss component 410 may comprise a node of a distributed system (e.g., a node 110 in FIG. 1) or a mining rig. The loss component 410 may comprise a computing device, such as a desktop computer, a mining rig, a user device, and/or a server. The loss component 410 may comprise a part of a computing device, such as an application, a program, a thread, and/or an API.

The loss component 410 may be configured to determine a loss of an NFT. The NFT may comprise a token, a blockchain transaction, metadata that describes a digital asset, and/or a cryptographic signature that when decoded points to an internet hosting location (e.g., of a digital asset). The NFT may be associated with a digital asset. The loss component 410 may be configured to determine the loss of the NFT based on a lack of access, a report of a lack of access, unauthorized transfer of the NFT from its storage location, and/or, in embodiments an owner of the NFT having an insurance policy covering the NFT and/or a digital asset associated with the NFT. The loss of the NFT may comprise a difficulty and/or inability to access the NFT (e.g., the transaction, the token, and/or the digital asset), unauthorized transfer, technical failure, or other circumstances. The loss of the NFT may comprise a degradation of a branch of the blockchain, such as a branch on which the NFT was stored. The loss of the NFT may comprise a forking of a blockchain (e.g., a hard fork, a soft fork, etc.) that results in the NFT's content or rights being compromised. The NFT may be stored on the blockchain prior to the forking (e.g., on the original blockchain) or on a prong of the fork and may be difficult or impossible to access.

The loss of the NFT may comprise a loss of data needed to access the NFT. The data may be stored on a user device and the user device may break, be lost, or get hacked, as examples. The data may be stored in a wallet on the user device and the wallet may be lost (e.g., crash, be deleted, account be closed, deleted, or hacked, etc.) For example, a key needed to decrypt at least a portion of the NFT may be lost from a user device and/or a wallet on the user device. As another example, an identifier needed to locate the transaction on the blockchain may be lost from a user device and/or a wallet on the user device. A report of lost, destroyed, or stolen hardware or credentials can establish such a loss in some embodiments. In embodiments, confirmation of loss can be predicated on the failure of alternative factors of authentication where multi-factor authentication is available, the failure of a device to respond or connect for a length of time (e.g., one day, one week, two weeks, one year), or other conditions.

The loss of the NFT may comprise a loss of the digital asset. For example, the digital asset may be removed from a storage location (e.g., a source of the digital asset), such as on a host computer or in the cloud. The digital asset may be removed from the storage location by a user. The digital asset may be removed from the storage location as a result of the storage location crashing, being hacked, or discontinuing services. The digital asset may be lost if a link, such as a URL, to a storage location of the digital asset breaks. The digital asset may disappear from the wallet on the user device.

The loss of the NFT may comprise the transaction including the NFT not being validated and/or added to a blockchain. For example, the transaction may not be added to the blockchain because it may not be sent to one or more nodes. The transaction may not be added to the blockchain because it may not have cryptocurrency or enough cryptocurrency attached as a mining fee to entice the nodes to validate the transaction and add it to the blockchain. The transaction may not be added to the blockchain because it may be missing one or more pieces of information needed by the nodes to validate the transaction, such as an address, a key, or the link to the digital asset.

The loss of the NFT may comprise the existence of an unauthorized or inauthentic duplicate of the NFT. For example, a NFT may be found granting rights to the digital asset to another user than the user granted rights by the original (e.g., lost) NFT. The loss of the NFT may comprise the occurrence of fraud associated with the NFT. For example, the transferor of the NFT may not have had rights or ownership of the digital asset and/or the digital asset may not be authentic.

In embodiments, the loss component 410 may determine the loss of the NFT by monitoring and/or searching the blockchain. For example, the loss component 410 may search the blockchain for a transaction comprising the NFT, an address of a party to the NFT, and/or another identifier of the transaction. The loss component 410 may determine that the NFT is lost based on a failure to find the transaction on the blockchain. The loss component 410 may determine that the NFT is lost based on the transaction being found on the blockchain but missing a piece of information. The loss component 410 may determine the loss of the NFT by searching for the NFT and/or a piece of data on the user device and/or on the wallet on the user device. The loss component 410 may determine the loss of the NFT by searching for the digital asset, such as by testing the link to the digital asset.

The system 400 may comprise a search component 420. The search component 420 may comprise a node of a distributed system (e.g., a node 110 in FIG. 1) or a mining rig. The search component 420 may comprise a computing device, such as a desktop computer, a mining rig, a user device, and/or a server. The search component 420 may comprise a part of a computing device, such as an application, a program, a thread, and/or an API.

The search component 420 may be configured to conduct a search to identify a digital twin of the NFT. The search component 420 may be configured to conduct the search based on receiving an indication that the NFT is lost, such as from the loss component 410.

The digital twin of the NFT may be another blockchain transaction comprising the NFT (e.g., the same token, the same cryptographic signature, the same link, etc.). The digital twin of the NFT may comprise another blockchain transaction comprising the same data contained in the original blockchain transaction comprising the NFT. The digital twin of the NFT may comprise another blockchain transaction issuing the digital asset to a party, such as the current transferor of the NFT. The digital twin of the NFT may comprise another link to the digital asset, a link to another storage location of the digital asset, and/or another transaction with the other link or the link to another storage location. The digital twin of the NFT may comprise a copy of the NFT, the transaction, and/or the digital asset, such as on a different blockchain, a database, or a record.

The search component 420 may search for the digital twin of the NFT by searching the blockchain, searching a database of digital assets (e.g., an NFT marketplace), and/or searching in the wallet on the user device. The search component 420 may search for the digital twin of the NFT using a search term, such as the cryptographic signature of the NFT, the link to the digital asset, metadata describing the digital asset, a signature of a party to the transaction, and/or another identifier of the NFT. The digital twin of the NFT may be secure, such as being encrypted, being authenticatable, and/or being immutable (e.g., stored to the blockchain). The search component 420 may be configured to authenticate the digital twin, such as by decrypting the digital twin and/or comparing data in the digital twin to the original NFT transaction. The search component 420 may be configured to determine whether the digital twin of the NFT can be found.

In embodiments, system 400 can include or be configured to communicate with (e.g., by search component 420) a backup database. The backup database can be included in or communicatively coupled with backup component 450 and search component 420. In embodiments, backup component 450 can create a secure backup of an NFT protected against loss (i.e., monitored by or accessible to loss component 410). Backup component 450 can use a public blockchain, or private user credentials, to copy the data from an NFT and create a digital twin. The digital twin can be stored in the backup database, which can be searched by search component 420 after a loss is determined by loss component 410. The data of the backup database can be secured against access to ensure it does not compromise the value of the NFT by maintaining its uniqueness but may be accessible only to system 400 to ensure a user can be made whole in the event of loss of the individual NFT for which a digital twin is created in the backup database. In alternative embodiments, no backup component 450 or backup database are utilized.

The system 400 may comprise a minting component 430. The minting component 430 may comprise a node of a distributed system (e.g., a node 110 in FIG. 1) or a mining rig. The minting component 430 may comprise a computing device, such as a desktop computer, a mining rig, a user device, and/or a server. The minting component 430 may comprise a part of a computing device, such as an application, a program, a thread, and/or an API.

The minting component 430 may be configured to mint a replacement NFT for the lost NFT. The mint component 430 may be configured to mint the replacement NFT based on receiving an indication that the digital twin of the NFT was found, such as from the search component 420.

Minting the replacement NFT may comprise generating a new cryptographic signature pointing to the digital asset. Minting the replacement NFT may comprise generating a new token. Minting the replacement NFT may comprise storing a transaction storing the cryptographic signature and/or token to the blockchain, such by sending an indication of the transaction and/or the cryptographic signature/token to nodes of the blockchain. Minting the replacement NFT may comprise appending a blockchain to indicate that the NFT is deprecated, such as by storing a transaction on the blockchain indicating that the original NFT is replaced.

The minting component 430 may be configured to award rights to the replacement NFT to an owner of the lost NFT. The minting component 430 may be configured to award the rights by including a wallet address and/or key associated with the owner in the transaction. The minting component 430 may be configured to award the rights by saving an indication of the NFT to a wallet or device of the owner. The minting component 430 may be configured to notify systems associated with NFT's of the replacement NFT. For example, the minting component 430 may send a notification to a NFT database or marketplace.

The minting component 430 may be configured to mint and/or award rights to the replacement NFT after a hold period. The hold period may be initiated when the NFT is determined to be lost and/or when the search is conducted for the duplicate NFT. The hold period may be a predetermined time. The hold period may be a time calculated, such as based on a value of the lost NFT, a size of the blockchain, a time for a transaction to be validated, a time for a transaction to be stored to the blockchain, and/or a size of an NFT marketplace associated with the NFT, as examples.

The system 400 may comprise a compensation component 440. The compensation component 440 may comprise a node of a distributed system (e.g., a node 110 in FIG. 1) or a mining rig. The compensation component 440 may comprise a computing device, such as a desktop computer, a mining rig, a user device, and/or a server. The compensation component 440 may comprise a part of a computing device, such as an application, a program, a thread, and/or an API.

The compensation component 440 may be configured to determine a compensation for the owner of the NFT. The compensation component 440 may be configured to determine a compensation for the owner of the NFT based on receiving an indication that the digital twin of the NFT was not found, such as from the minting component 430. The compensation component 440 may be configured to determine the compensation based on a value of the digital asset, such as an original cost of the digital asset or a current value of the digital asset (e.g., with inflation, appreciation, etc.).

The compensation component 440 may be configured to determine the compensation based on a coverage amount of an insurance policy that the owner has on the digital asset and/or the NFT. The compensation may be in the form of a local currency, such as U.S. Dollars or Euros. The compensation may be in the form of cryptocurrency. The compensation may be in the form of credits. The compensation component 440 may be configured to issue the compensation to the owner, such as by generating a blockchain transaction to send the compensation to the wallet of the owner.

The compensation component 440 may be configured to determine and/or issue the compensation after a hold period. The hold period may be initiated when the NFT is determined to be lost, when the search is conducted for the duplicate NFT, and/or when the replacement NFT is minted. The hold period may be a predetermined time. The hold period may be a time calculated, such as based on a value of the lost NFT, a size of the blockchain, a time for a transaction to be validated, a time for a transaction to be stored to the blockchain, and/or a size of an NFT marketplace associated with the NFT, as examples.

Figure 5:
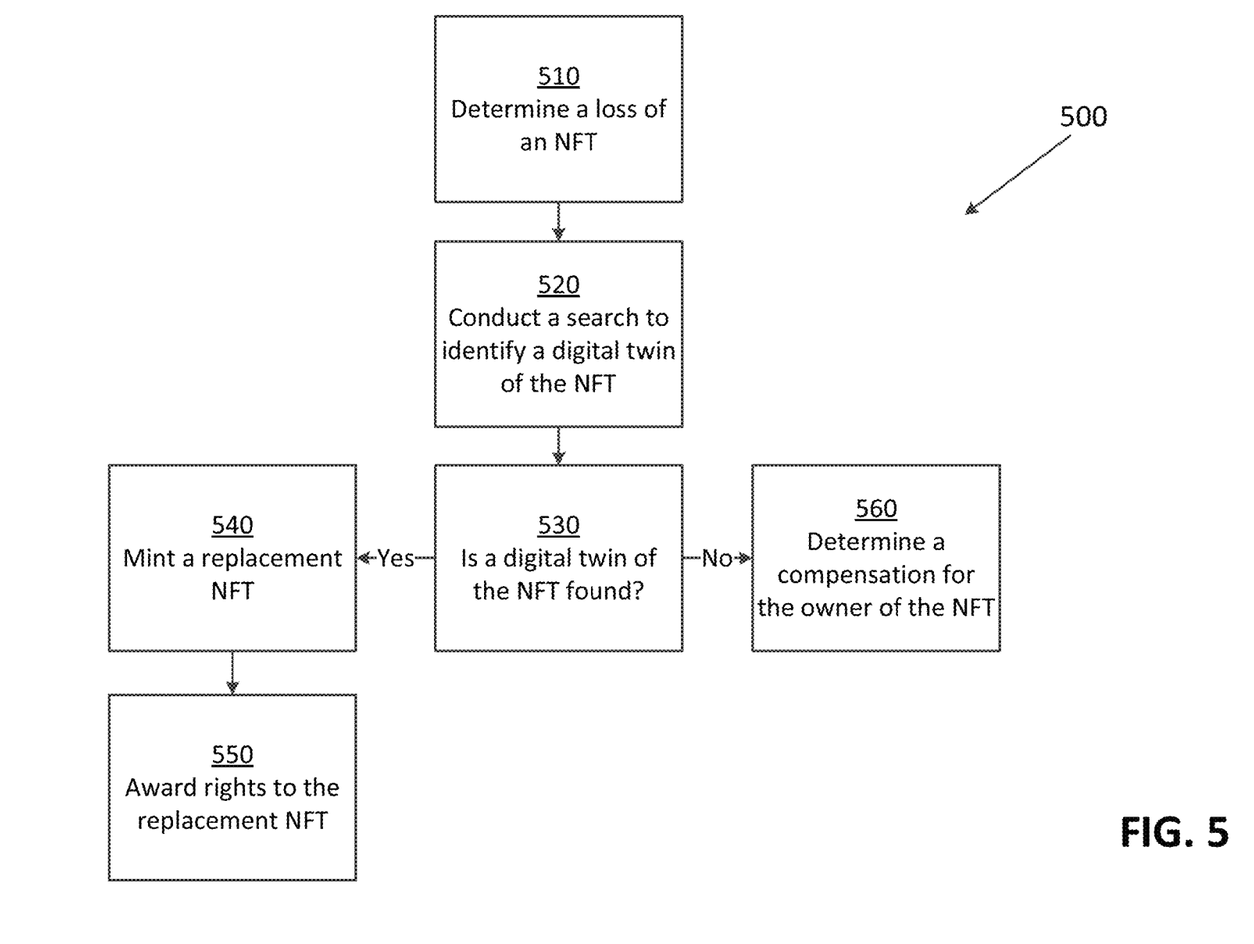
FIG. 5 shows an example method for insurance for NFT's and digital assets.

FIG. 5 shows a method for insurance for NFT's and digital assets 500. The method 500 may be performed by the system 400 in FIG. 4. At step 510, a loss of an NFT may be determined. The loss of the NFT may be determined by a computing device or a component (e.g., the loss component 410 in FIG. 4). The NFT may comprise a blockchain transaction or a token. The NFT may be associated with a digital asset. The loss of the NFT may comprise a difficulty and/or inability to access the NFT (e.g., the transaction, the token, and/or the digital asset). The loss of the NFT may comprise a degradation of a branch of the blockchain, such as a branch on which the NFT was stored. The loss of the NFT may comprise a forking of a blockchain (e.g., a hard fork, a soft fork, etc.). The NFT may be stored on the blockchain prior to the forking (e.g., on the original blockchain) or on a prong of the fork and may be difficult or impossible to access.

The loss of the NFT may comprise a loss of data needed to access the NFT. The data may be stored on a user device and the user device may break, be lost, or get hacked, as examples. The data may be stored in a wallet on the user device and the wallet may be lost (e.g., crash, be deleted, account be closed, deleted, or hacked, etc.) For example, a key needed to decrypt at least a portion of the NFT may be lost from a user device and/or a wallet on the user device. As another example, an identifier needed to locate the transaction on the blockchain may be lost from a user device and/or a wallet on the user device.

The loss of the NFT may comprise a loss of the digital asset. For example, the digital asset may be removed from a storage location (e.g., a source of the digital asset), such as on a host computer or in the cloud. The digital asset may be removed from the storage location by a user. The digital asset may be removed from the storage location as a result of the storage location crashing, being hacked, or discontinuing services. The digital asset may be lost if a link, such as a URL, to a storage location of the digital asset breaks. The digital asset may disappear from the wallet on the user device.

The loss of the NFT may comprise the transaction including the NFT not being validated and/or added to a blockchain. For example, the transaction may not be added to the blockchain because it may not be sent to one or more nodes. The transaction may not be added to the blockchain because it may not have cryptocurrency or enough cryptocurrency attached as a mining fee to entice the nodes to validate the transaction and add it to the blockchain. The transaction may not be added to the blockchain because it may be missing one or more pieces of information needed by the nodes to validate the transaction, such as an address, a key, or the link to the digital asset.

The loss of the NFT may comprise the existence of a duplicate of the NFT. For example, a NFT may be found granting rights to the digital asset to another user than the user granted rights by the original (e.g., lost) NFT. The loss of the NFT may comprise the occurrence of fraud associated with the NFT. For example, the transferor of the NFT may not have had rights or ownership of the digital asset and/or the digital asset may not be authentic.

The loss may be determined by monitoring and/or searching the blockchain. For example, the blockchain may be searched for a transaction comprising the NFT, an address of a party to the NFT, and/or another identifier of the transaction. The loss of the NFT may be determined based on a failure to find the transaction on the blockchain. The loss of the NFT may be determined based on the transaction being found on the blockchain, but missing a piece of information. The loss of the NFT may be determined by searching for the NFT and/or a piece of data on the user device and/or on the wallet on the user device. The loss of the NFT may be determined by searching for the digital asset, such as by testing the link to the digital asset. Other aspects pertaining to loss or determination of loss are set forth elsewhere herein (e.g., describing system 400).

At step 520, a search may be conducted to identify a digital twin of the NFT. Step 520 may be performed by a computing device or a component (e.g., search component 420 in FIG. 4). The search may be conducted based on receiving an indication that the NFT is lost, such as from the loss component 410.

The digital twin of the NFT may be another blockchain transaction comprising the NFT (e.g., the same token, the same cryptographic signature, the same link, etc.). The digital twin of the NFT may comprise another blockchain transaction comprising the same data contained in the original blockchain transaction comprising the NFT. The digital twin of the NFT may comprise another blockchain transaction issuing the digital asset to a party, such as the current transferor of the NFT. The digital twin of the NFT may comprise another link to the digital asset, a link to another storage location of the digital asset, and/or another transaction with the other link or the link to another storage location. The digital twin of the NFT may comprise a copy of the NFT, the transaction, and/or the digital asset, such as on a different blockchain, a database, or a record.

The search for the digital twin of the NFT may be conducted by searching the blockchain, searching a database of digital assets (e.g., an NFT marketplace), and/or searching in the wallet on the user device. The search for the digital twin of the NFT may be conducted using a search term, such as the cryptographic signature of the NFT, the link to the digital asset, metadata describing the digital asset, a signature of a party to the transaction, and/or another identifier of the NFT. The digital twin of the NFT may be secure, such as being encrypted, being authenticatable, and/or being immutable (e.g., stored to the blockchain). The digital twin may be authenticated, such as by decrypting the digital twin and/or comparing data in the digital twin to the original NFT transaction. At step 530, it may be determined whether the digital twin of the NFT can be found. Step 530 may be performed by the same computing device and/or component than that which performs step 520 or a different computing device and/or component.

In embodiments, method 500 can include a backup function. The backup function. In some embodiments, the backup function can precede, e.g., determination of a loss at 510. When an NFT is insured, protected, identified, or otherwise undergoes monitoring, a digital twin of NFT (e.g., the blockchain entry, material to which the blockchain entry points, other data defining or associated with the NFT) can be created and stored in a backup database as described throughout this specification. After a loss, the backup database can be searched to determine whether a digital twin is available therein. In embodiments, the backup database is separately administered, and no creation step need precede the loss in the performance of method 500; rather, backups can be created in another manner, but such a backup database can still be searched during method 500.

At step 540, a replacement NFT may be minted. The replacement NFT may be minted by a computing device and/or a component (e.g., the minting component 430). The replacement NFT may be minted based on the NFT being found. The replacement NFT may be minted based on receiving an indication that the digital twin of the NFT was found, such as from the search component 420.

Minting the replacement NFT may comprise generating a new cryptographic signature pointing to the digital asset. Minting the replacement NFT may comprise generating a new token. Minting the replacement NFT may comprise storing a transaction storing the cryptographic signature and/or token to the blockchain, such by sending an indication of the transaction and/or the cryptographic signature/token to nodes of the blockchain. Minting the replacement NFT may comprise appending a blockchain to indicate that the NFT is deprecated, such as by storing a transaction on the blockchain indicating that the original NFT is replaced.

At step 550, rights may be awarded to the replacement NFT. The rights may be awarded by the same computing device and/or component that performs step 540. The rights may be awarded to an owner of the NFT. The rights may be awarded by including a wallet address and/or key associated with the owner in the transaction. The rights may be awarded by saving an indication of the NFT to a wallet or device of the owner.

At step 560, a compensation may be determined for the owner of the NFT. The compensation may be determined by a computing device and/or a component (e.g., the compensation component 440 in FIG. 4). The compensation may be determined based on receiving an indication that the digital twin of the NFT was not found, such as from the minting component 430. The compensation may be determined based on a value of the digital asset, such as an original cost of the digital asset or a current value of the digital asset (e.g., with inflation, appreciation, etc.). The compensation may be determined based on a coverage amount of an insurance policy that the owner has on the digital asset and/or the NFT. The compensation may be in the form of a local currency, such as U.S. Dollars or Euros. The compensation may be in the form of cryptocurrency. The compensation may be in the form of credits. The compensation may be issued to the owner, such as by generating a blockchain transaction to send the compensation to the wallet of the owner.

Figure 6:
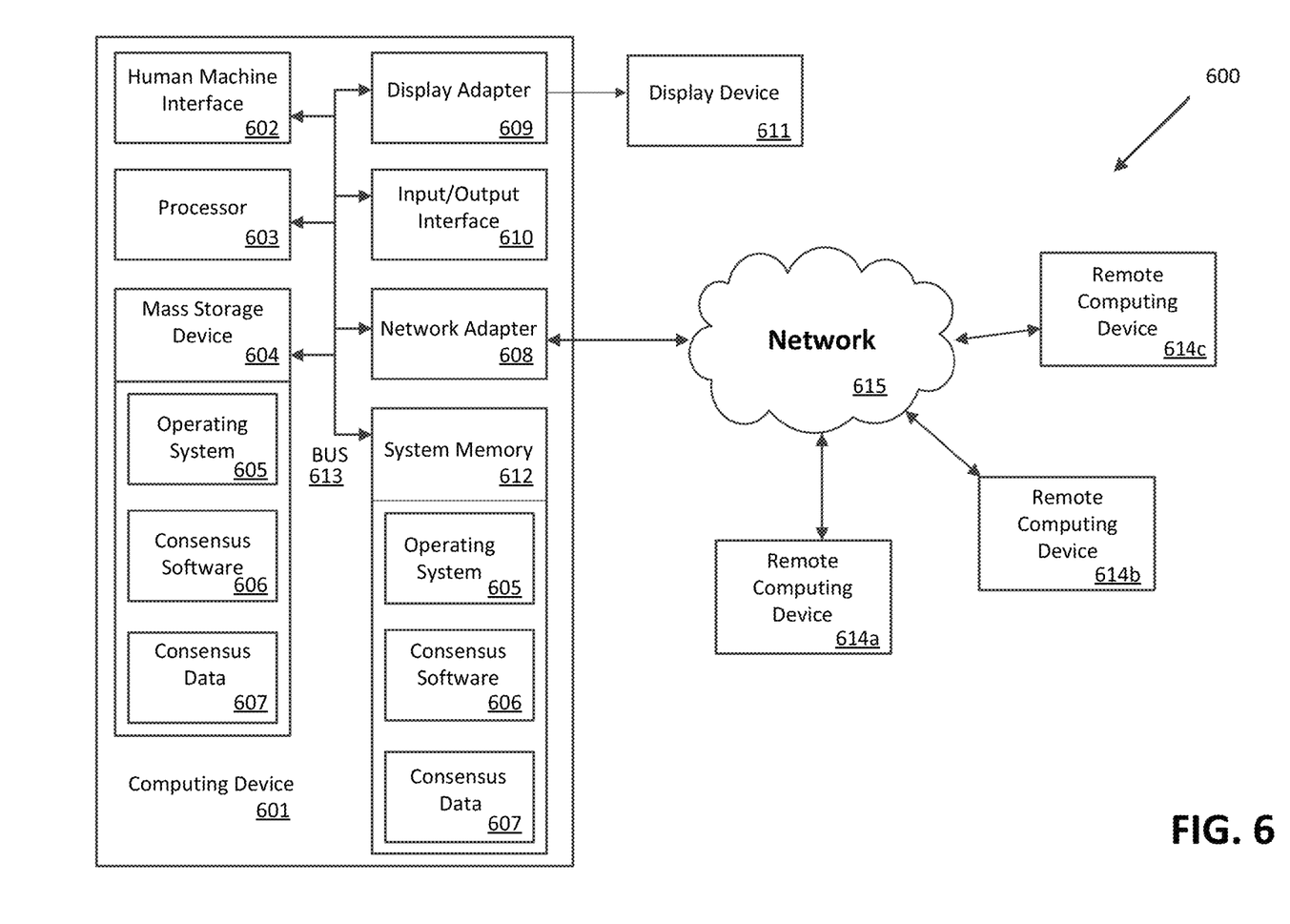
FIG. 6 shows an example computing environment.

FIG. 6 shows a block diagram illustrating an exemplary operating environment 600 for insurance for NFT's and digital assets 500. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, etc. that performs particular tasks or implement particular abstract data types. The disclosed methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods disclosed herein may be implemented via a general-purpose computing device in the form of a computing device 601. The components of the computing device 601 may comprise, but are not limited to, one or more processors or processing units 603, a system memory 612, and a system bus 613 that couples various system components including the processor 603 to the system memory 612. In the case of multiple processing units 603, the system may utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description may also be implemented over a wired or wireless network connection and each of the subsystems, including the processor 603, a mass storage device 604, an operating system 605, entitlement software 606, entitlement data 607, a network adapter 608, system memory 612, an Input/Output Interface 610, a display adapter 609, a display device 611, and a human machine interface 602, may be contained within one or more remote computing devices 614a,b,c at physically separate locations, connected through buses of this form, in effect implementing a fully distributed system.

The computing device 601 typically comprises a variety of computer readable media. Exemplary readable media may be any available media that is accessible by the computing device 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as entitlement data 607 and/or program modules such as operating system 605 and entitlement software 606 that are immediately accessible to and/or are presently operated on by the processing unit 603.

In another aspect, the computing device 601 may also comprise other removable/non-removable, volatile/non-volatile computer storage media. By way of example, FIG. 6 illustrates a mass storage device 604 which may provide non-volatile storage of computer code, computer readable instructions, data structures, program modules, and other data for the computing device 601. For example and not meant to be limiting, a mass storage device 604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 604, including by way of example, an operating system 605 and entitlement software 606. Each of the operating system 605 and entitlement software 606 (or some combination thereof) may comprise elements of the programming and the entitlement software 606. Entitlement data 607 may also be stored on the mass storage device 604. Entitlement data 607 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

In another aspect, the user may enter commands and information into the computing device 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices may be connected to the processing unit 603 via a human machine interface 602 that is coupled to the system bus 613, but may be connected by other interface and bus structures, such as a parallel port, game port, an IEEE 694 Port (also known as a Firewire port), a serial port, or a universal serial bus (USB).

In yet another aspect, a display device 611 may also be connected to the system bus 613 via an interface, such as a display adapter 609. It is contemplated that the computing device 601 may have more than one display adapter 609 and the computer 601 may have more than one display device 611. For example, a display device may be a monitor, an LCD (Liquid Crystal Display), or a projector. In addition to the display device 611, other output peripheral devices may comprise components such as speakers (not shown) and a printer (not shown) which may be connected to the computing device 601 via Input/Output Interface 610. Any step and/or result of the methods may be output in any form to an output device. Such output may be any form of visual representation, including, but not limited to, textual, graphical, animation, audio, tactile, and the like. The display 611 and computing device 601 may be part of one device, or separate devices.

The computing device 601 may operate in a networked environment using logical connections to one or more remote computing devices 614*a,b,c*. By way of example, a remote computing device may be a personal computer, portable computer, a smart phone, a server, a router, a network computer, a peer device or other common network node, and so on. Logical connections between the computing device 601 and a remote computing device 614*a,b,c* may be made via a network 615, such as a local area network (LAN) and a general wide area network (WAN). Such network connections may be through a network adapter 608. A network adapter 608 may be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of entitlement software 606 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The invention claimed is:

1. A non-transitory computer-readable medium storing instructions that when executed by a processor perform a method, the method comprising:
    determining an unauthorized transfer of a non-fungible token (NFT) on a blockchain administered through a network of nodes defining a decentralized database;
    determining, based on unauthorized transfer of the NFT at least one block of the blockchain for controlling the NFT, a loss of the non-fungible token (NFT) by an owner;
    searching a database to identify a digital twin of the NFT, wherein access to the database is restricted to replacement of one or more non-fungible tokens, wherein the NFT is one of the non-fungible tokens, and wherein searching the database comprises decrypting digital twin records in the database and comparing data representing details of the NFT to the one or more digital twin records;
    if the digital twin of the NFT is found in the database based on the data representing details of the NFT matching one of the one or more digital twin records:
        minting a replacement NFT to at least one new block on the blockchain using the digital twin and,
        awarding rights to the replacement NFT to the owner by placing a wallet held by the owner in control of the at least one new block;
    if the digital twin of the NFT is not found in the database, determining, based on a value of the NFT, a compensation for the owner of the NFT; and
    transferring the compensation to the owner.

2. The method of claim 1, wherein the minting the replacement NFT comprises appending a blockchain to indicate that the NFT is depreciated.

3. The method of claim 1, wherein the method further comprises initiating, based on the determining the loss of the NFT, a hold period, wherein the hold period is based on an amount of time for a transaction to be validated on the blockchain; and
    wherein the minting the replacement NFT or transferring the compensation to the owner of the NFT is further based on the hold period ending.

4. The method of claim 1, further comprising notifying systems associated NFT's of the replacement NFT.

5. The non-transitory computer-readable medium of claim 1, wherein the database is the blockchain.

6. The non-transitory computer-readable medium of claim 1, wherein the database is a secure database configured to store digital twins of one or more non-fungible tokens.

7. The non-transitory computer-readable medium of claim 1, wherein the database is a second blockchain.

8. The non-transitory computer-readable medium of claim 1, wherein the data representing details of the NFT comprises a search term.

9. The non-transitory computer-readable medium of claim 8, wherein the search term includes a cryptographic signature or a link to a digital asset associated with the NFT.

10. A non-transitory computer readable storage medium, storing instructions that, when executed by a processor, cause:
    determining a loss of a non-fungible token (NFT), wherein the loss is based on an unauthorized transfer of the NFT;
    searching a database to identify a digital twin of the NFT, wherein access to the database is restricted to replacement of one or more non-fungible tokens, wherein the NFT is one of the non-fungible tokens, and wherein searching the database comprises decrypting digital twin records in the database and comparing data representing details of the NFT to the one or more digital twin records;
    if the digital twin of the NFT is found based on the data representing details of the NFT matching one of the one or more digital twin records, minting a replacement NFT using the digital twin and awarding rights to the replacement NFT to an owner; and
    if the digital twin of the NFT is not found, determining, based on a value of the NFT, a compensation for the owner of the NFT, and transferring the compensation to the owner.

11. The non-transitory computer readable storage medium of claim 10, wherein the minting the replacement NFT comprises appending a blockchain to indicate that the NFT is depreciated.

12. The non-transitory computer readable storage medium of claim 10, wherein the determining the loss of the NFT comprises determining an occurrence of duplicate NFT minting or fraud.

13. The non-transitory computer readable storage medium of claim 10,
wherein the instructions further cause initiating, based on the determining the loss of the NFT, a hold period, wherein the hold period is based on an amount of time for a transaction to be validated on the blockchain; and
wherein the minting the replacement NFT or the transferring the compensation to the owner of the NFT is further based on the hold period ending.

14. The non-transitory computer readable storage medium of claim 10, wherein the replacement NFT comprises an indication of a transaction associated with the NFT.

15. The non-transitory computer readable storage medium of claim 10, wherein the determining the loss of the NFT is based on a determination that the owner has an insurance policy covering the NFT.

16. A computing device comprising:
one or more processors; and
instructions stored on non-transitory computer memory that, when executed by the one or more processors, cause the computing device to:
determine a loss of a non-fungible token (NFT), wherein the loss is based on an unauthorized transfer of the NFT;
search to identify a digital twin of the NFT, wherein comprises decrypting digital twin records and comparing data representing details of the NFT to the one or more digital twin records;
if the digital twin of the NFT is found based on the data representing details of the NFT matching one of the one or more digital twin records, mint a replacement NFT using the digital twin and awarding rights to the replacement NFT to an owner; and
if the digital twin of the NFT is not found, determine, based on a value of the NFT, a compensation for the owner of the NFT, and transferring the compensation to the owner.

17. The computing device of claim 16, wherein minting the replacement NFT comprises appending a blockchain to indicate that the NFT is depreciated.

18. The computing device of claim 16, wherein determining the loss of the NFT comprises determining an occurrence of duplicate NFT minting or fraud.

19. The computing device of claim 16, wherein the instructions further cause the computing device to initiate, based on determining the loss of the NFT, a hold period, wherein the hold period is based on an amount of time for a transaction to be validated on the blockchain; and
wherein minting the replacement NFT or transferring the compensation to the owner of the NFT is further based on the hold period ending.

20. The computing device of claim 16, wherein the instructions further cause the computing device to notify systems associated NFT's of the replacement NFT.

* * * * *